(12) United States Patent
Schmidt (10) Patent No.: US 11,345,391 B2
(45) Date of Patent: May 31, 2022

(54) STEERING COLUMN FOR A MOTOR VEHICLE

(71) Applicants: THYSSENKRUPP PRESTA AG, Eschen (LI); thyssenkrupp AG, Essen (DE)

(72) Inventor: René Schmidt, Lienz (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/976,117

(22) PCT Filed: Mar. 27, 2019

(86) PCT No.: PCT/EP2019/057708
§ 371 (c)(1),
(2) Date: Aug. 27, 2020

(87) PCT Pub. No.: WO2019/185704
PCT Pub. Date: Oct. 3, 2019

(65) Prior Publication Data
US 2021/0039706 A1    Feb. 11, 2021

(30) Foreign Application Priority Data

Mar. 28, 2018    (DE) ...................... 10 2018 204 735.9

(51) Int. Cl.
*B62D 1/19*    (2006.01)
*B62D 1/181*    (2006.01)

(52) U.S. Cl.
CPC ............. *B62D 1/195* (2013.01); *B62D 1/181* (2013.01)

(58) Field of Classification Search
CPC ................................ B62D 1/195; B62D 1/181
See application file for complete search history.

(56) References Cited

U.S. PATENT DOCUMENTS 9,428,213 B2 *   8/2016   Tinnin ................... B62D 1/195
9,616,914 B2     4/2017   Stinebring
(Continued)

FOREIGN PATENT DOCUMENTS

CN    105209317 A    12/2015
CN    107454880 A    12/2017
(Continued)

OTHER PUBLICATIONS

English Translation of International Search Report issued in PCT/EP2019/057708, dated Jun. 14, 2019.

*Primary Examiner* — Faye M Fleming
(74) *Attorney, Agent, or Firm* — thyssenkrupp North America, LLC (57) ABSTRACT

A steering column may include an inner casing tube in which a steering spindle is mounted rotatably about a longitudinal axis, an outer casing unit in which the inner casing tube is retained, and a motorized adjustment drive for longitudinal relative movement between the outer casing unit and the inner casing tube. The inner casing tube and the outer casing unit are coupled via an energy absorption device that has at least two energy absorption elements and a coupling device. A first energy absorption element can be coupled or uncoupled between the inner casing tube and the outer casing unit via the coupling device, which energy absorption element can be plastically deformed in the coupled state with relative displacement in the longitudinal direction of the inner casing tube and the outer casing unit. The coupling device has a coupling element that is movable between the uncoupled and the coupled state. The coupling element can be brought into operative engagement with a coupling piece that is connected to the first energy absorption element.

15 Claims, 6 Drawing Sheets

(56) References Cited

U.S. PATENT DOCUMENTS

| | | | | |
|---|---|---|---|---|
| 10,759,465 B2* | 9/2020 | Ganahl | ................ | B62D 1/184 |
| 10,807,630 B2* | 10/2020 | Caverly | ................ | B62D 1/192 |
| 10,960,917 B2* | 3/2021 | Schnitzer | ............... | B62D 1/195 |
| 11,014,599 B2* | 5/2021 | Kirmsze | ................ | B62D 1/181 |
| 11,059,512 B2* | 7/2021 | Fricke | ................ | B62D 1/195 |
| 2007/0194563 A1* | 8/2007 | Menjak | ................ | B62D 1/195 |
| | | | | 280/777 |
| 2013/0233117 A1* | 9/2013 | Read | ................ | B62D 1/181 |
| | | | | 74/493 |
| 2015/0314801 A1 | 11/2015 | Gstohl et al. | | |
| 2016/0046318 A1 | 2/2016 | Stinebring | | |
| 2016/0121920 A1 | 5/2016 | Klepp et al. | | |
| 2018/0273082 A1 | 9/2018 | Gstohl et al. | | |

FOREIGN PATENT DOCUMENTS

| | | | | |
|---|---|---|---|---|
| DE | 102012111890 B3 | 12/2013 | | |
| DE | 10 2013 112 124 A1 | 5/2015 | | |
| DE | 102016214709 A | 2/2018 | | |
| DE | 102016214709 A1 * | 2/2018 | ............. | B62D 1/184 |
| DE | 102017201708 A1 * | 8/2018 | ............. | B62D 1/192 |
| WO | 2015/062740 A1 | 5/2015 | | |

\* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2019/057708, filed Mar. 27, 2019, which claims priority to German Patent Application No. DE 10 2018 204 735.9, filed Mar. 28, 2018, the entire contents of both of which are incorporated herein by reference.

FIELD

The present disclosure generally relates to steering columns for motor vehicles.

BACKGROUND

In order to adapt the steering wheel position to the sitting position of the driver of a motor vehicle, steering columns are known in different embodiments in the prior art. In the case of generic steering columns, the steering wheel attached to the rear end of the steering spindle can be positioned by means of a length adjustment in the direction of the steering spindle longitudinal axis in the longitudinal direction of the vehicle interior.

The length adjustability is achieved in that the inner casing tube, also referred to as the inside casing tube or the casing tube for short, in that the steering spindle is mounted rotatably relative to the outer casing unit, also referred to as the outside casing unit or the casing unit for short, in the direction of the longitudinal axis, i.e. telescopically adjustable in the longitudinal direction.

As an effective measure for improving passenger safety in case of a vehicle collision—the so-called crash scenario—during which the driver collides with the steering wheel at high speed, it is known in the art for the steering column to be configured to be collapsible in the longitudinal direction when a force is exerted on the steering wheel which exceeds a limit value only occurring in the crash scenario. In order to ensure controlled braking of a body encountering the steering wheel, an energy absorption device is coupled between the outer casing unit and the inner casing tube. This converts the kinetic energy introduced into plastic deformation of one or multiple energy absorption elements through the tearing of a pull-off closure or bending of an elongated bending element such as a bending wire or bending strip, for example.

A generic steering column is described in U.S. Pat. No. 9,616,914 B2. It is proposed therein that the braking action of the energy absorption device should be controllable so that consideration can be given in the crash scenario of whether the driver has his seatbelt fastened or not, or to allow an adjustment to be made to parameters such as driver weight, distance from the steering wheel, and the like. More specifically, at least two energy absorption elements in the form of bending strips are provided which can be activated when required, in that they are coupled between the outer casing unit and the inner casing tube, in that they are operatively connected mechanically between the engagement part and the inner casing tube. For coupling to the energy absorption element, the coupling device has a carrier element which can be brought into operative engagement with a first energy absorption element. The coupling device can be switched, in order to couple or uncouple this energy absorption element selectively between the inner casing tube and the outer casing unit. In this way, switchable braking characteristics which are individually adapted to the requirements in each case, i.e. an adjusted crash level, can be achieved.

In the case of the energy absorption device known in the art, it is provided that the carrier element of the coupling device directly meshes mechanically with a pyroelectric actuator or pyroswitch on the first energy absorption element, a bending strip. The disadvantage of this is that when switching an undefined force can be exerted on the energy absorption element transversely to the deformation direction, the longitudinal direction. Moreover, during uncoupling the energy absorption element which is then uncoupled is no longer held by the uncoupled carrier element and is located in an unfixed, spatially undefined state between the inner casing tube and the outer casing unit, as a result of which uncontrolled friction and deformation can occur in the crash scenario, which can result in the energy absorption characteristics being compromised.

Thus a need exists for a steering column with an improved, switchable energy absorption device which provides for increased reliability at each switched energy absorption level.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steering column for a motor vehicle. In some examples, a steering column may comprise an inner casing tube in which a steering spindle is mounted rotatably about its longitudinal axis, an outer casing unit in which the inner casing tube is retained, and which can be directly or indirectly connected to the body of a motor vehicle. A motorized adjustment drive may be arranged between the outer casing unit and the inner casing tube, by means of which the outer casing unit and the inner casing tube can be displaced relative to one another in the direction of the longitudinal axis. The inner casing tube and the outer casing unit may be coupled via an energy absorption device which has at least two energy absorption elements and a coupling device. At least a first energy absorption element can be coupled or uncoupled between the inner casing tube and the outer casing unit via the coupling device, which energy absorption element can be plastically deformed in the coupled state with a relative displacement in the longitudinal direction of the inner casing tube and the outer casing unit, and the coupling device has a coupling element which is movable between the uncoupled and the coupled state.

According to the invention, it is provided in the case of a steering column of the kind referred to above that the coupling element can be operatively engaged with a coupling piece which is connected to the first energy absorption element.

The coupling piece forms a coupling element which is configured separately from the energy absorption element with which the coupling element of the coupling device interacts. In the activated state, the coupling element engages with the coupling piece and thereby ensures that the coupling piece is supported on the outer casing unit in the longitudinal direction. The fact that the coupling piece is connected to the energy absorption element means that it forms an integrated force-transmission element, i.e. a kind of intermediate element, between the energy absorption element and the coupling device, via which the force flow from the outer casing unit to the energy absorption element is achieved in a crash scenario.

In order to deactivate the energy absorption element, the coupling element is moved by the coupling device so that it is uncoupled from operative engagement with the coupling piece and the force flow between the outer casing unit and the energy absorption element is interrupted. According to the invention, the coupling piece remains in engagement with the energy absorption element in this case.

The coupling piece forms an additional intermediate element separate from the energy absorption element which is used for the application of force but is not deformed for energy absorption in a crash scenario and, in particular, furthermore remains connected to the energy absorption element during uncoupling. The coupling element is not immediately in direct contact with the energy absorption element, as in the prior art, but indirectly via the coupling piece. During coupling or uncoupling, the coupling element is brought into or out of contact with the coupling piece, so that there is no direct, potentially detrimental interaction between the coupling element and the energy absorption element.

The fact that the coupling piece is configured separately from the energy absorption element means that an adjustment to different structural circumstances can take place, for example to differently shaped coupling elements, and in addition, or alternatively, to differently configured energy absorption elements. The engagement of the coupling device can be adjusted in terms of position and distance between the outer casing unit and the energy absorption element through a corresponding configuration of the coupling piece as an intermediate element for force transmission. In this way, a flexible use of a coupling device and/or of energy absorption elements on different steering column designs is easier to achieve.

Moreover, the coupling piece according to the invention can be supported on the outer casing unit, so that any transverse forces that may be exerted during coupling or uncoupling can be intercepted, in order to uncouple the energy absorption element from potentially functionally damaging loads. Moreover, the coupling piece can be guided relative to the outer casing unit, so that in the uncoupled state it is ensured that the then free end of the energy absorption element can be guided along on a predefined path in a controlled manner. In this way, uncontrolled friction and deformation in a crash scenario are avoided, as a result of which functional and operational safety is improved.

For support and guidance, the coupling piece according to the invention can be largely freely configured in terms of shape and size, in order to optimize the coupling and uncoupling of the coupling element and to avert potentially harmful influences from the energy absorption element. The possible uses are thereby increased and the necessary expenditure during the development and production of steering columns is advantageously reduced.

The motorized adjustment drive is attached between the outer casing unit and the inner casing tube, by means of which drive the outer casing unit and the inner casing tube can be displaced relative to one another in the direction of the longitudinal axis. The motorized adjustment drive, for example a rotating or immersion spindle drive as described below, is supported on the outer casing in the longitudinal direction and engages with an actuating element on the inner casing tube capable of motorized adjustment in the longitudinal direction.

The inner casing tube and the outer casing unit are coupled via an energy absorption device, wherein this should be understood to mean that the energy absorption device is arranged in the force flow between the inner casing tube and the outer casing unit, in relation to a force acting in the direction of the longitudinal axis. In this case, one or multiple intermediate elements can be provided between the energy absorption device and the inner casing tube or between the energy absorption device and the outer casing unit. Consequently, it may be provided in an advantageous development that the adjustment drive is arranged between the energy absorption device and the outer casing unit. The adjusting drive and the energy absorption device are thereby arranged in series relative to the force flow between the inner casing tube and the outer casing unit.

The coupling piece may have a carrier element which engages with the first energy absorption element. The coupling piece is connected to the first energy absorption element via the carrier element. The carrier element is preferably configured as a form-fitting element which engages with the energy absorption element in a form-fitting manner in relation to a relative movement in the longitudinal direction. For the use of different embodiments, the carrier element can be adapted to the fastening means of the respective energy absorption element.

It is advantageous for the coupling piece to be guided in a guide means in the direction of the longitudinal axis. Along with the coupling element, the energy absorption element connected thereto is guided in the guide means in the longitudinal direction relative to the outer casing unit when the coupling device is in the uncoupled state. In this way, the free end of the energy absorption element with which a carrier element of the coupling piece engages in a form-fitting manner, for example, is also moved in a controlled manner relative to the outer casing unit in the uncoupled state in a crash scenario.

A previously mentioned guide means can be advantageously achieved in that the coupling piece comprises a guide body which is received in a guide groove. The guide body in this case is guided displaceably relative to the outer casing unit in the longitudinal direction. The guide groove may be realized in an element connected to the outer casing unit and extend linearly in the longitudinal direction, for example. The guide body may be configured as a sliding block which can be slid along in the guide groove when the energy absorption element is uncoupled in a crash scenario. A forced control of this kind can be achieved at little cost in compact form and with a reliable function.

In an advantageous development, the guide groove has a portion with a reduced groove width, wherein the coupling piece has a width which is greater than the groove width in the portion with the reduced groove width, wherein the width of the coupling piece is smaller than the groove width of the guide groove outside the portion with the reduced groove width. The coupling piece is inserted in a force-fitting manner in the guide groove in this portion with the reduced groove width, wherein in a crash scenario when the energy absorption element is uncoupled, the coupling piece is moved out from the portion of the guide groove with a reduced groove width while overcoming a predefined release force and can then slide along in the guide groove with play.

The coupling piece may have a coupling receiving means to which the coupling element can be connected. In the activated state, the coupling element engages with the coupling receiving means, so that a connection for force transmission from the coupling device via the coupling piece to the energy absorption element is produced. In the uncoupled state, the coupling element is removed from the coupling receiving means and the force transmission is interrupted, so that the coupling piece can move relative to the coupling device in a crash scenario. The coupling receiving means may be configured as a coupling opening arranged transversely to the longitudinal axis, for example, with which a coupling element configured as a coupling bolt, for example, can engage in a form-fitted manner. For uncoupling, the coupling bolt of the coupling device is simply removed from the coupling opening.

An advantageous embodiment of the invention envisages that the energy absorption device has a predetermined breaking element. In relation to force transmission in a crash scenario, the predetermined breaking element is arranged parallel to the energy absorption elements and ensures that the forces occurring during normal running between the outer casing unit and the inner casing tube are absorbed and do not therefore act on the energy absorption elements. Only when a predetermined limiting force which occurs in a crash scenario is exceeded does the predetermined breaking element break and release the relative movement for deformation of the energy absorption element or energy absorption elements. The predetermined breaking element may, for example, be designed as a shear pin, a rivet or as a screw which is inserted and supported between the outer casing unit and the inner casing tube transversely to the longitudinal axis preferably in a form-fitting manner.

An advantageous embodiment of the invention envisages that a support plate is coupled to the outer casing unit. The support plate forms a support part which is supported on the outer casing unit in the longitudinal direction. The adjustment drive for the length adjustment of the steering column can be arranged between the support plate and the outer casing unit. A spindle nut can be supported on the support plate non-rotatably in relation to a rotation about the spindle axis in the longitudinal direction, with which spindle nut a threaded spindle that can be driven rotatably about its spindle axis by a motorized spindle drive engages. In a preferred embodiment it may be provided that the spindle nut is held non-rotatably in relation to a rotation about the spindle axis on a support element which is coupled to the support plate, or else fastened thereto. The spindle drive of this adjustment drive referred to as a rotational spindle drive is supported in the longitudinal direction on the outer casing unit, so that a relative rotation of the thread spindle and the spindle nut causes a telescoping displacement of the inner casing tube relative to the outer casing unit for the length adjustment of the steering column.

Alternatively, an adjustment drive can be realized as an immersion spindle drive, a spindle drive design in which the threaded spindle is supported non-rotatably in the longitudinal direction between the inner casing tube and the outer casing unit, and the spindle nut can be driven rotatably in a motorized manner. In this case the threaded spindle is coupled to the support plate.

The support plate may comprise the guide means. The guide means explained above for guiding the coupling piece in the direction of the longitudinal axis may be configured in the support plate, for example as a guide groove running in the longitudinal direction, in which a guide body of the coupling piece is mounted in a slidingly displaceable manner.

The carrier connected to the second energy absorption element can be fixed to the support plate. The second energy absorption element which is not switchable can be permanently coupled via the support plate between the outer casing unit and the inner casing tube via the carrier. The carrier may be formed by a connection element engaging with the support plate and the energy absorption element in a form-fitted manner, for example. The connection element may be configured as a peg.

The support plate is preferably configured as a cast component. Particularly preferably, the support plate is formed from an aluminum alloy.

The support plate may be connected via the predetermined breaking element to the inner casing tube. The predetermined breaking element described above in terms of its function may be configured as a shearing pin or shearing rivet, for example, which is inserted between the support plate and the inner casing tube transversely to the longitudinal axis preferably in a form-fitting manner, so that in a crash scenario a relative movement between the outer casing unit and the inner casing tube is released when a limit force is exceeded. The support of the predetermined breaking element on the support plate is functional and easy to assemble.

The coupling device can preferably be fixed to the support plate. A pyroswitch of a coupling device, the function of which is explained above, may be mounted on the support plate, wherein the movable coupling element—for example a coupling bolt that can be moved transversely to the longitudinal axis—can be brought either into, or out of, engagement with the coupling element according to the invention. In this way, a compact and easy-to-produce arrangement can be achieved. In the case of the pyroswitch, a pyrotechnic propelling charge is ignited and the energy thereby released causes the coupling element to move between the positions already described.

The adjustment drive in this case can make contact with the support plate in such a manner that the force during a crash is conducted in the longitudinal direction from the inner casing tube via the energy absorption device—for a coupled energy absorption element via the coupling piece or the carrier—the support plate, and the adjustment drive to the outer casing unit.

At least one energy absorption element can be formed as a U-shaped bending element which has two legs connected to one another by a bend, wherein the one leg can be fixed to the engagement part or to the connection part, and the other leg can be supported on the inner casing tube in the longitudinal direction. It is known per se for an energy absorption element to be configured as a bending wire or bending strip which is formed in a U-shape by a bend of preferably 180°, wherein the two U-legs opposite one another extend substantially parallel to the longitudinal direction, wherein "substantially parallel" should be understood to mean a deviation with a spatial angle of ±10°. The end of the one leg is connected to the inner casing tube in relation to a movement in the longitudinal direction, for example in that in a crash scenario it is supported in the longitudinal direction on a stop or abutment of the inner casing tube. In order to introduce the force, the other end is connected to the switchable coupling piece or the permanent carrier according to the invention, is carried in the longitudinal direction from the aforementioned end in a crash scenario. When there is a relative longitudinal displacement of the two ends in a crash scenario, the bend migrates in the longitudinal direction over the longitudinal extent of the bending element, wherein kinetic energy is converted or absorbed by deformation work.

Two or more identically, or substantially identically, configured energy absorption elements can be used, for example structurally identical U-shaped bending elements. The bending elements may have the same outer dimensions while having a different energy absorption capacity. Interchangeability is thereby achieved, so that adapted, switchable energy absorption characteristics can be produced at little cost by combining different bending elements.

The two U-shaped bending elements can be arranged with their bend in the direction of the front of the vehicle. It is also conceivable and possible, however, for one or both of the two U-shaped bending elements to be arranged in such a manner that the bends are oriented in different directions or towards the front of the vehicle.

The coupling piece and/or the carrier may each have a substantially bolt-shaped carrier element which is in engagement with a leg of the respective bending element. The bending element may have a portion bent transversely to the longitudinal direction, with which the carrier element engages in a form-fitting manner and guarantees reliable carrying along in the longitudinal direction in a crash scenario.

The bending elements may be arranged in such a manner that at least two bending elements are identically oriented with their legs in the longitudinal direction. In this case, the U-legs viewed from the bend point in the same longitudinal direction parallel to the longitudinal axis. In this way, the bending elements are identically deformed in a crash scenario, which is advantageous with regard to reproducible energy absorption properties.

At least two energy absorption elements can be arranged consecutively in the longitudinal direction. The bending elements are preferably separately configured and arranged spaced apart from one another in the longitudinal direction. In this way, a flat design which requires little installation space in the radial direction can be achieved. The assertion that the bending elements are separately configured means that the at least two bending elements are not directly connected to one another but are each only separately connected with the one leg to the inner casing tube and with the other leg to the coupling piece or the carrier. The fact that the bending elements are spaced apart from one another in the longitudinal direction further guarantees that there can be no mutual interference during the energy-absorbing deformation in a crash scenario. There is preferably a positive distance in the longitudinal direction between the bend of the one bending element and the ends of the legs of the other bending element.

It may be advantageous for the energy absorption elements to be arranged in a shared housing. The housing forms part of the energy absorption device according to the invention which encloses the energy absorption elements, at least in part, and protects against disturbing influences. Furthermore, fastening elements for the energy absorption elements, longitudinal guides for the carrier elements, and the like, can be configured in or on the housing. In this way, the energy absorption elements are housed in a protected manner. Moreover, a compact design can be realized in a small installation space.

It may be provided in an advantageous development that the energy absorption device is arranged between the inner casing tube and the adjustment drive. Consequently, in a crash scenario there is a relative movement between the inner casing tube and the adjustment drive which is fixed to the outer casing unit. The adjustment drive preferably has a support element, wherein the energy absorption device is coupled to the support element and the inner casing tube.

In an advantageous development, it may be provided alternatively or in addition that the energy absorption device is arranged between the outer casing unit and the adjustment drive. Consequently, with the alternative arrangement there is a relative movement between the outer casing unit and the adjustment drive fixed to the inner casing tube in a crash scenario. In the case of the additional arrangement, there is a relative movement between the inner casing tube, the outer casing unit, and the adjustment drive in each case.

Figure 1:
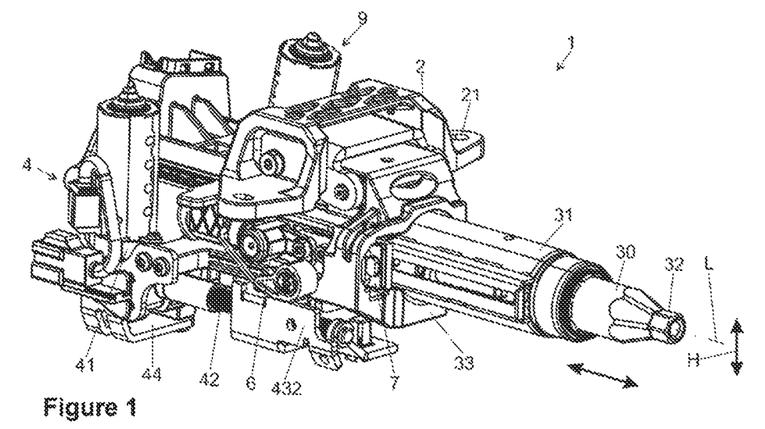
FIG. 1 is a perspective view of an example steering column.
Figure 2:
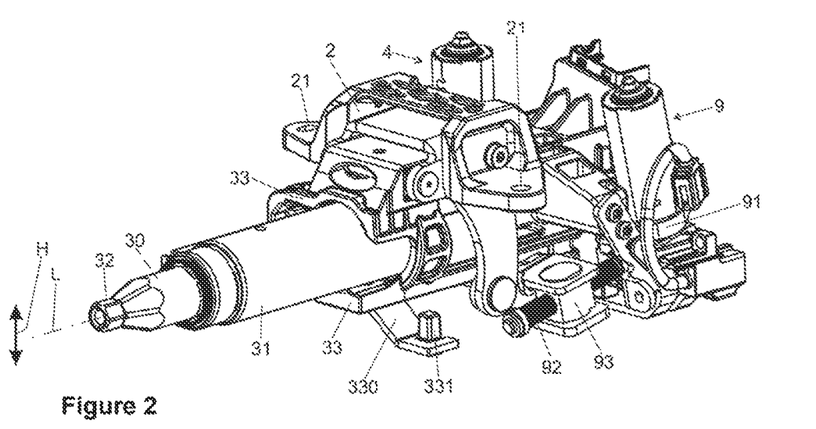
FIG. 2 is a perspective view of a steering column according to FIG. 1.

A steering column 1 according to the invention is schematically depicted as a perspective view obliquely from behind (in relation to the driving direction of a motor vehicle which is not shown) in FIGS. 1 and 2.

The steering column 1 can be fastened to the body of a motor vehicle which is not shown by means of a bracket 2 which has been omitted from the view in FIG. 2 for the sake of clarity. The bracket 2 comprises fastening means 21 for fastening to the vehicle body.

A steering spindle 30 is rotatably mounted in an inner casing tube 31, also referred to as an internal casing tube 31, about its longitudinal axis L which extends forwardly in the longitudinal direction. A fastening portion 32 for fastening a steering wheel which is not shown is formed at the rear on the steering spindle 30. The inner casing tube 31 is displaceably retained telescopically in the longitudinal direction in an outer casing unit 33, also referred to as an external casing unit 33 or a casing unit 33 for short.

A motorized adjustment drive 4 comprises an electrical drive unit 41 having an electric motor which is supported on the outer casing unit 33 in the longitudinal direction by means of a yoke-type supporting component 44 and can be driven rotatably by the one threaded spindle (spindle) 42 extending in a substantially longitudinal direction, which spindle is screwed into a spindle nut 43 arranged non-rotatably in relation thereto, which is supported on the inner casing tube 31 in a longitudinal direction via a support element 432.

In this way, a rotational spindle drive is achieved in which the rotating drive of the threaded spindle 42 means that the distance in the longitudinal direction between the drive unit 41 and the spindle nut 43 can be adjusted. Through activation of the drive unit 41, the inner casing tube 31 can be retracted or extended telescopically relative to the outer casing unit 33 for the length adjustment of the steering column 1, as depicted by a double arrow.

Figure 3:
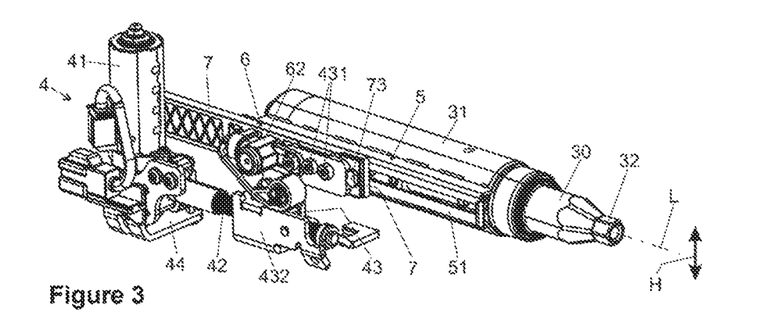
FIG. 3 is a perspective detail view of the steering column according to FIG. 1.
Figure 4:
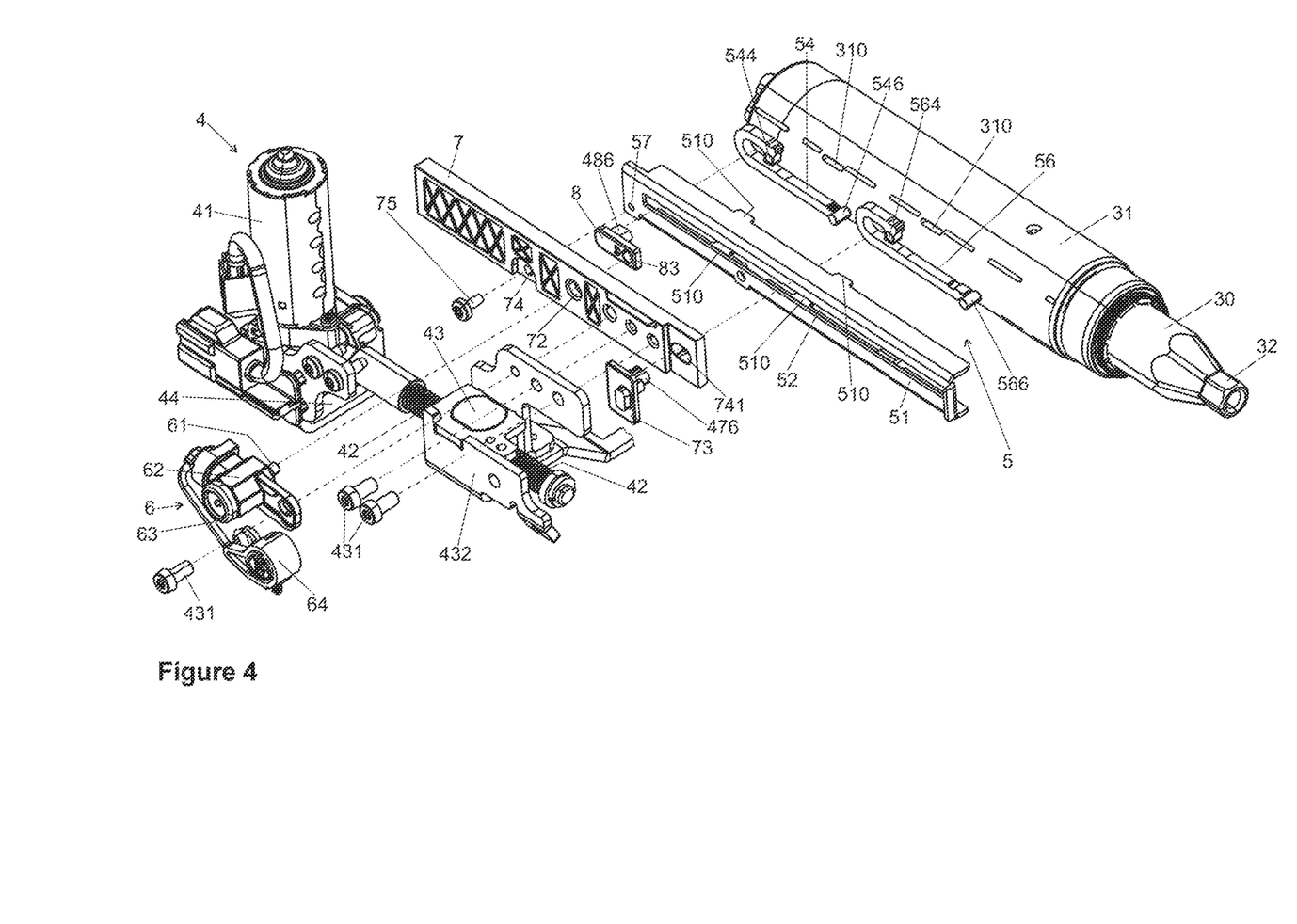
FIG. 4 is an exploded detail view of the steering column according to FIG. 1.
Figure 6:
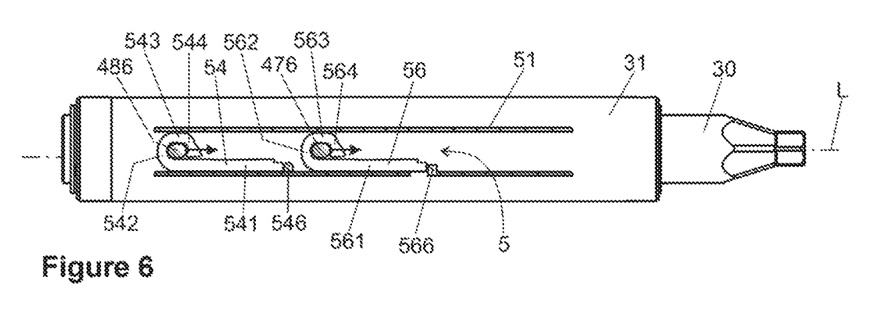
FIG. 6 is a side view of example energy absorption elements of the energy absorption device according to FIG. 5.

An energy absorption device 5 which is explained in greater detail below is arranged between the outer casing unit 33 and the inner casing tube 31. This can be seen in FIG. 3 in which the outer casing unit 33 is omitted in the same perspective as in FIG. 1. FIG. 6 shows an exploded view of the arrangement from FIG. 3.

The energy absorption device 5 comprises a housing 51, also referred to as a holding profile 51, in the form of a C-shaped rail with a substantially rectangular cross section which is fixedly connected to the inner casing tube 31 and extends in the longitudinal direction, wherein the open cross section is directed towards the outside of the inner casing tube 31. By means of form-fitting elements 510 which engage with corresponding receiving openings 310 in the inner casing tube 31, the housing 51 is fixedly connected to the casing tube 31, by means of laser welding for example. On its radially outwardly facing outside, the housing 51 configured as a holding profile has a slot 52 extending parallel to the longitudinal axis L.

A first energy absorption element 54 and a second energy absorption element 56 are arranged in the housing 51 spaced apart in the longitudinal direction.

The outer casing unit 33 comprises a yoke 330, wherein this yoke 330 has a free end in which a recess is formed, in which an insertion piece 331 is received non-rotatably in a force-fitting manner. The insertion piece 331 comprises an internal threaded bore, wherein said internal thread bore is configured as a blind-hole opening and has the opening on the side of the insertion piece 331 facing away from the outer casing unit 33. A covering of the steering column which is not shown, for example a plastics subshell, can therefore be easily fixed to the steering column, in that a screw is screwed into the internal threaded bore and therefore fixes the covering to the steering wheel. The insertion piece 331 has an external square cone which is pressed into the recess in the yoke 330. The angle of the cone is preferably selected in such a manner that a self-locking effect prevails between the insertion piece 331 and the yoke 330.

In the example shown, energy absorption elements 54 and 56 which have the same shape and are identical in terms of their basic function are depicted in partially different views and operating states in FIGS. 4 to 10. The energy absorption elements 54 and 56 are each configured as a U-shaped bending wire or bending strip, having a first leg 541 or 561 which is connected via a bend 542 or 562 of substantially 180° to a second leg 543 or 563. At the end of the second leg 543 or 563, a carrier hook 544 or 564 is formed in each case by a bend towards the first leg 541 or 561. Consequently, an engagement opening 545 or 565 of an energy absorption element 54 or 56 is formed in each case by the legs 541, 543, the bend 542 and the carrier hook 544 or by the legs 561, 563, the bend 562 and the carrier hook 564. The energy absorption elements 54 and 56 may be configured as stamped parts, so that cost-effective production is guaranteed.

The energy absorption elements 54 and 56 are supported with their first leg 541 or 561 contrary to the longitudinal direction (arrow in FIG. 6) against abutments 546 or 566 projecting inwardly in the cross section of the housing 51, which abutments each form a stop in the longitudinal direction.

A coupling device 6 comprises a pin-shaped or bolt-shaped coupling element 61 which is attached to a pyro-electric actuator 62, or pyroswitch 62 for short, for example by means of fastening elements 431 such as screws or the like. During the electrical triggering or actuation of the actuator 62 in a crash scenario, a pyrotechnic propellant charge is ignited, through which the coupling element 61 is moved in its axial direction transversely to the longitudinal direction of the longitudinal axis L, in the direction of the actuator 62 indicated by the arrow in FIG. 4. The actuator 62 is electrically connected to a connector 64 via an electrical line 63 in the form of a cable. The connector 64 can be connected to a second connector which is not shown wherein the second connector is connected to the vehicle electrical system.

The spindle nut 43 is fixedly held in a support element 432 in the longitudinal direction, wherein the support element 432 is connected to a support plate 7 by means of a fastening element 431, and is located on the outside, viewed from the inner casing tube 31.

Figure 11:
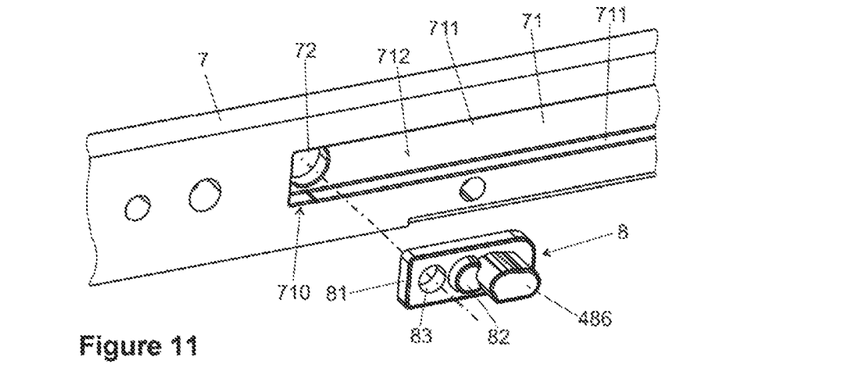
FIG. 11 is a detail view of an example coupling piece.

On its inside, which lies against the housing 51 in the mounted state from the outside, the support plate 7 has a guide device in the form of a guide groove 71, as can be seen in FIG. 11. A coupling piece 8 according to the invention can be received displaceably in the longitudinal direction in the guide groove 71, as indicated by the arrow in FIG. 11.

The coupling piece 8 has a guide body 81 which can slide along in the guide groove 71 in the longitudinal direction. On its inside facing the inner casing tube 31, a carrier element 486 is formed on the coupling piece 8 which extends in the transverse direction through the slot 52 of the housing 51 and engages in each operating state of the energy absorption device 5 behind the carrier hooks 544 of the first energy absorption element 54, as shown in FIGS. 5, 6, 7, 8, 9 and 10. In this case, a guide piece 82 may be configured to slide along in the slot 52.

The guide groove 71 has two edge portions 711 extending parallel to one another and a groove bottom 712, wherein the edge portions 711 define the width of the guide groove 71. The guide groove 71 has a portion 710 with a reduced groove width which is formed at the closed end of the guide groove 71. In order to realize the portion 710 with the reduced groove width, a projection extends into the guide groove 71 starting from the edge portion 711. The guide body 81 of the coupling piece 8 has a width which is greater than the groove width in the portion 710 with a reduced groove width, wherein the width of the guide body 81 of the coupling piece 8 is smaller than the groove width of the guide groove outside the portion 710 with a reduced groove width. The coupling piece 8 is inserted in a force-fitting manner in the guide groove 71 in this portion 710 with the reduced groove width, wherein in a crash scenario when the energy absorption element 54 is uncoupled, the coupling piece 8 is moved out from the portion 710 of the guide groove 71 with a reduced groove width while overcoming a predefined release force and can then slide along in the guide groove 71 with play between the edge portions 711.

The coupling piece 8 also has a coupling opening 83 arranged transversely to the longitudinal axis L as the coupling receiving means, which coupling opening may be configured as a through-opening, as shown, or is at least open outwardly to the support plate 7.

The support plate 7 has an opening 72 through which the bolt-shaped coupling element 61 extends into the coupling opening 83 in the coupled state of the coupling device 6 and produces a form-fitting connection to the support plate 7 in respect of the longitudinal direction.

In the uncoupled state, the coupling element 61 is removed from the coupling opening 83 by igniting the pyroelectric actuator 62, so that the coupling piece 8 can move loosely in the guide groove 71 in the longitudinal direction in a crash scenario. The actuator 62 has an insertion portion which is inserted in the opening 72 of the support plate 7. In this way, a sufficiently tight fit of the actuator 62 can be guaranteed, as said actuator is supported with the insertion portion in the longitudinal direction in the opening 72. The guide body 81 of the coupling piece 8 lies flush against the groove bottom 712. Consequently, when the coupling element 61 is in the coupled state in the crash scenario, it is subject to shear strain which is an advantage compared with an embodiment in which the coupling element 61 is subject to bending loads. This means that operational safety can be improved.

A carrier 73 is fixed to the support plate 7 and has a carrier element 476 on its inside facing the inner casing tube 31, which carrier element extends in the transverse direction through the slot 52 in the housing 51 and engages behind the carrier hook 564 of the second absorption element 56 in each operating state of the energy absorption device 5, as shown in FIGS. 5, 6, 7, 8, 9 and 10. The carrier 73 is fixed in a form-fitted manner in an opening 741 in the support plate 7.

The support plate 7 is connected to the housing 51 via a predetermined breaking element in the form of a shear pin 75. The shear pin 75 is fixed in a form-fitting manner in a further opening 74 in the support plate 7 and in a corresponding opening 57 in the housing 51.

The support element 432 which supports the spindle nut 43 is connected to the support plate 7 by means of fastening elements 431. Consequently, the support plate 7 is supported on the outer casing unit 33 via the adjustment drive 4 in the longitudinal direction, wherein the adjustment drive 4 is fastened to the outer casing unit 33 by means of the yoke-shaped support component 44.

Figure 5:
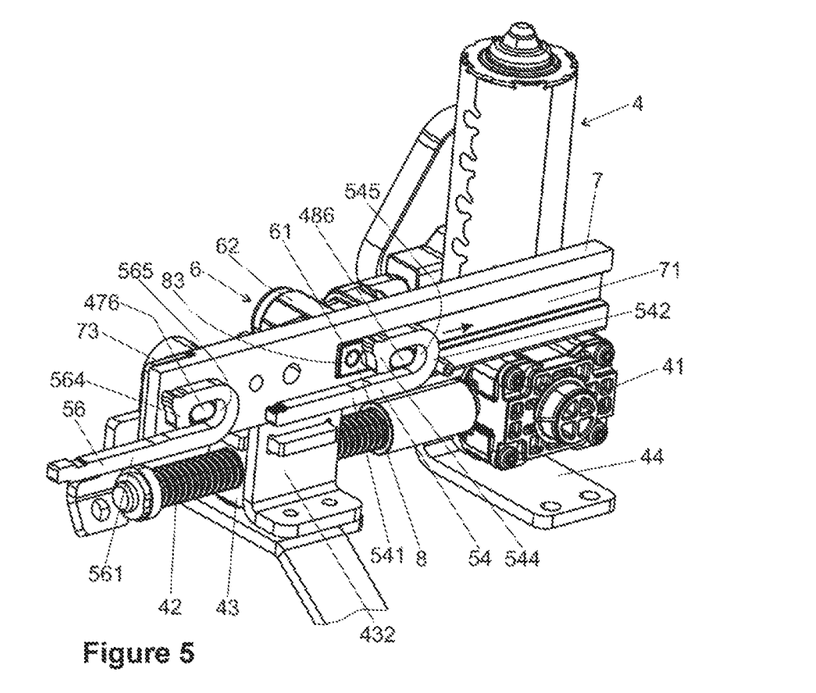
FIG. 5 is a detail view of an example energy absorption device in a normal running state.

In the coupled state, which is depicted in the normal operating state prior to a crash in FIGS. 5 and 6, the coupling element 61 of the coupling device 6 engages with the coupling opening 83 and thereby brings about a form-fitted locking of the coupling piece 8 to the support plate 7 in the longitudinal direction. In this case, the first energy absorption element 54 is connected to the support plate 7 by the carrier element 486 of the coupling piece 8 and the second energy absorption element 56 by the carrier element 476 of the carrier 73.

In a crash scenario, the high force peak which occurs causes the shear pin 75 to break and allows the inner casing tube 33 to be pushed in forwardly telescopically in the longitudinal direction into the outer casing unit 33. The inner casing tube 31 in this case is moved relative to the support plate 7 and—in the coupled state—the two carrier elements 486 and 476, as shown by the arrows in FIG. 6.

Figure 7:
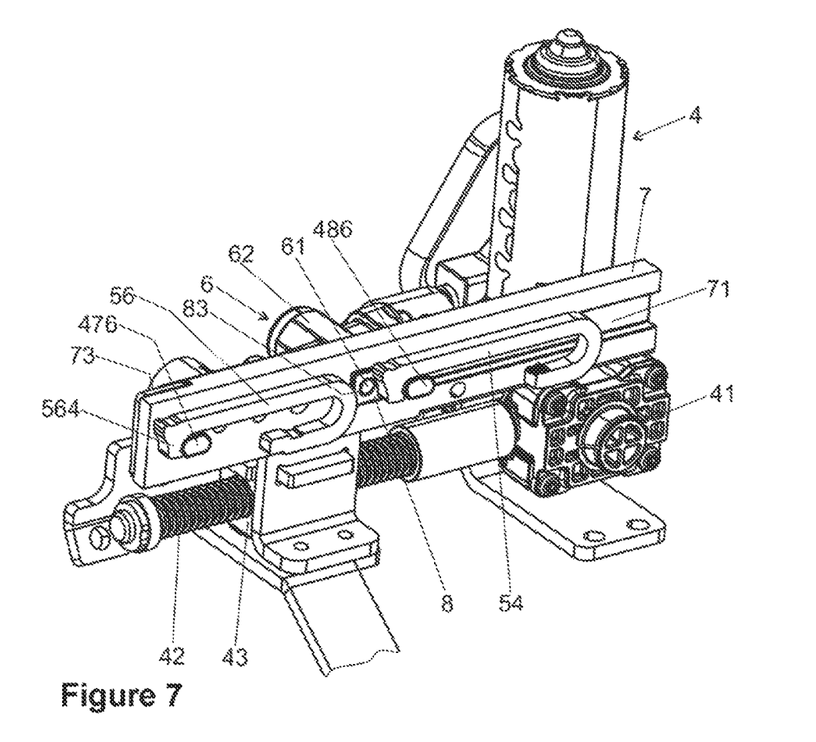
FIG. 7 is a detail view of an energy absorption device according to FIG. 5 in a state following a crash with the energy absorption elements coupled.
Figure 8:
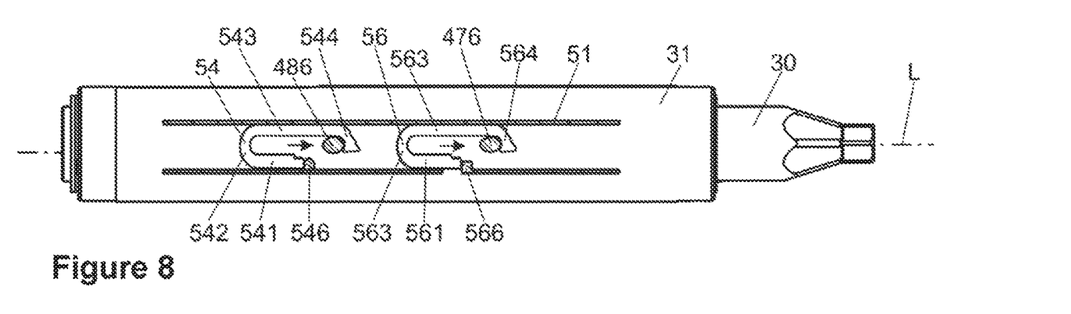
FIG. 8 is a side view of the energy absorption device according to FIG. 7 in a representation similar to FIG. 6.

In this way—as in the end state following a crash—both energy absorption elements 54 and 56 are bent over and plastically deformed, as shown in FIGS. 7 and 8. In this case, which is referred to as a high-load crash, the greatest possible kinetic energy is absorbed.

Figure 9:
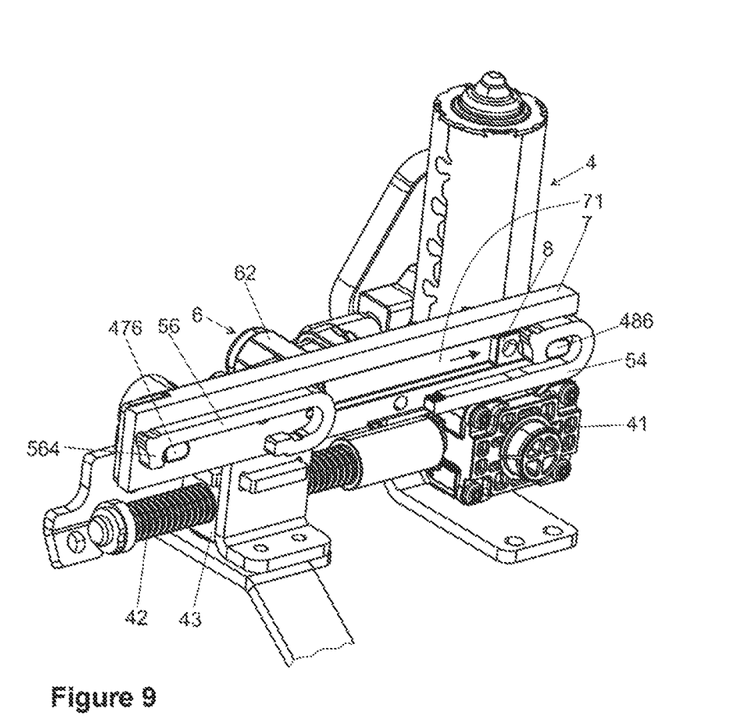
FIG. 9 is a detail view of an energy absorption device according to FIG. 5 in a state following a crash with an uncoupled energy absorption element.
Figure 10:
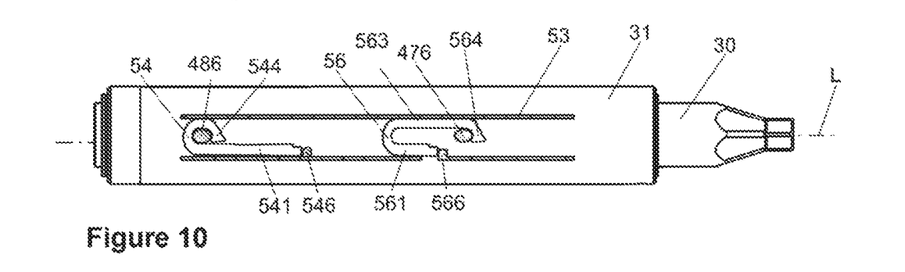
FIG. 10 is a side view of the energy absorption device according to FIG. 9 in a representation similar to FIG. 6.

If only a relatively small energy absorption is necessary, such as in the case of a low driver weight, for example, or a crash at low speed, the pyroswitch 62 is activated so that the coupling element 61 is removed from the coupling opening 83 and a relative movement of the coupling piece 8 is released. In this uncoupled state, only the second energy absorption element 56 permanently connected to the support plate 7 via the carrier 73 is deformed. This uncoupled state following a crash is depicted in FIGS. 9 and 10. It can be seen in FIG. 9 how the coupling piece 8 is carried along by the undeformed energy absorption element 54 and guided along in the guide groove 71 in the longitudinal direction.

During uncoupling through the removal of the coupling element 61 from the coupling opening 83, the transverse forces which occurred were held off the first energy absorption element 54 by the intermediate coupling piece 8. In a crash scenario, the disabled energy absorption element 54 which has remained undeformed is safely guided by the coupling piece 8 on the support plate 7, so that no harmful deformation can occur.

By means of a second motorized adjustment drive 9 which is likewise configured as a rotational spindle drive with a motorized drive unit 91, and a thread spindle 92 which can be driven rotatably thereby and which is screwed into a spindle nut 93, the adjustment drive 9 is supported between the bracket 2 and the outer casing unit 33 and allows motorized adjustment of the steering spindle 30 in the vertical direction H.

A perspective detail view of an inner casing tube 31 in different embodiments is shown in FIGS. 12 to 15 in each case, wherein the inner casing tube 31 in FIGS. 1 to 4, 6, 8 and 10 can be replaced by an inner casing tube 31 in FIGS. 12 to 15. The difference between the inner casing tube 31 from FIGS. 1 to 4, 6, 8 and 10 and the embodiments in FIGS. 12 to 15 is that the inner casing tubes 31 have a locking pot 311. A locking pot 311 of this kind is a coupling receiving device for coupling the inner casing tube 31 to a steering lock. A steering lock of this kind is known from DE 10 2013 112 124 A1, for example, wherein the steering lock comprises a locking pin which can be brought into engagement with the steering spindle 30 and in the engaged state locks, or at least severely restricts, the rotation of the steering spindle 30 about the longitudinal axis L. The locking pot 311 in the different embodiments shown in FIGS. 12 to 15 is attached to the opposite side of the housing 51 in each case. The locking pot 311 is configured as a hollow profile, preferably as a square hollow profile, and has a receiving opening 314 into which a portion of the steering lock which is not shown is inserted. The locking pin is received in this portion of the steering lock and displaceably guided.

FIGS. 12 to 15 show an inner casing tube 31 for a steering column of a motor vehicle for the rotatable receiving of a steering spindle 30, wherein the inner casing tube 31 comprises a locking pot 311 which has a receiving opening 314 into which a portion of a steering lock can be introduced, wherein the inner casing 31 has an opening which corresponds to the receiving opening 314, wherein the locking pot 311 has a double-walled portion 312, 313, 317, 318, wherein the double-walled portion is formed from a first wall 312, 317 and a second wall 313, 318, wherein the first wall 312, 317 has a first opening 315 and the second wall 313, 318 has a second opening 316, wherein the first opening 315 and the second opening 316 overlap at least in part, wherein the midpoint of the first opening 315 is displaced in respect of the midpoint of the second opening 316. Consequently, the openings 315, 316 are not concentric or coaxial in respect of one another.

Figure 16:
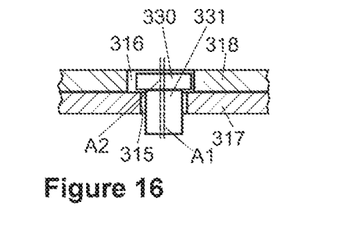
FIG. 16 is a schematic sectional view of a double-walled portion of a locking pot.

The openings 315, 316 in the double-walled portion of the locking pot 311 form a stepped bore for receiving a fastening element, preferably a shearable screw, which is used for fastening the steering lock to the inner casing tube 31. A shearable screw of this kind comprises a shaft portion which projects through the opening 315 and a head which is received in the second opening 316. A form-fitting element is arranged in the head 330, which form-fitting element is arranged on the side of the head facing away from the shaft 331. This form-fitting element can be coupled with a screwdriver. After the shearing screw has been screwed in, the form-fitting element is separated from the head 330. Thanks to the displacement of the midpoints of the openings 315, 316 in respect of one another, it is not immediately possible for a tool to be fitted to the head 330 and the shearing screw removed and consequently for the steering lock to be removed from the locking pot 311, since the head at one point is such a small distance from the second wall 313, 318 that it does not allow the fitting of a tool. This can be particularly clearly seen from FIG. 16. FIG. 16 shows a schematic sectional depiction of the double-walled portion of the locking pot. The distance of the head 330 from the second wall 318 on the right side is smaller than on the left side. The axis A1 of the first opening 315 is arranged displaced in respect of the axis A2 of the second opening 316; they are therefore spaced apart from one another. The axes A1, A2 are arranged parallel to one another. The second opening 316 preferably has a larger diameter than the first opening 315.

Figure 12:
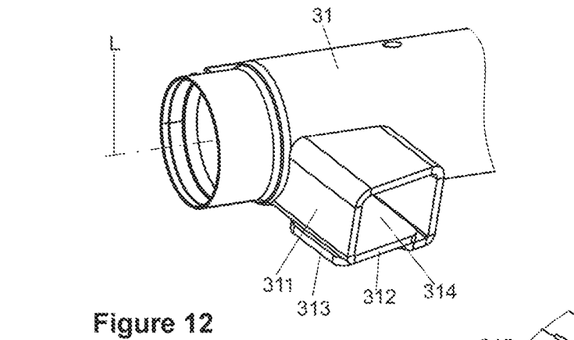
FIG. 12 is a detail view of another example inner casing tube.
Figure 13:
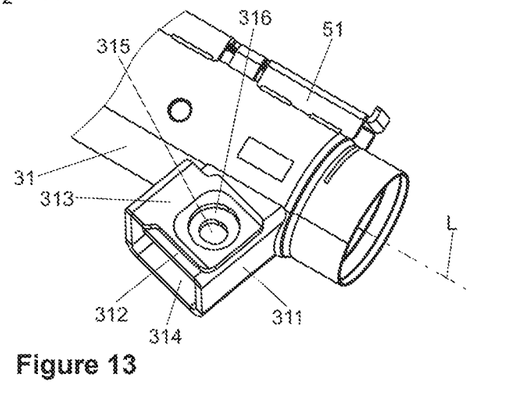
FIG. 13 is another detail view of the inner casing tube in FIG. 12.

In the embodiment in FIGS. 12 and 13 the locking pot is formed from a single piece of formed metal sheet, wherein the metal sheet has first and second portions which overlap and therefore provide the first wall 312 and the second wall 313 in this overlapping portion. The first and second wall 312, 313 are welded to one another. The locking pot 311 is likewise welded to the inner casing tube 31.

Figure 14:
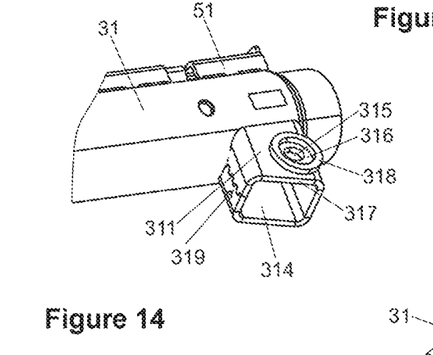
FIG. 14 is a detail view of yet another example inner casing tube.

In the embodiment in FIG. 14 the second wall 318 is formed by a ring which is fixed on the locking pot 311. The ring has the second opening 316. The locking pot 311 is formed by a metal sheet which has been bent and the ends of which have been connected to one another by means of a form-fitted, dovetail-type frame 319 and therefore form the receiving opening 314. The frame 319 can be additionally strengthened by means of a welding process. As an alternative to a frame 319, a butt joint can also be used, wherein the ends are welded to one another.

Figure 15:
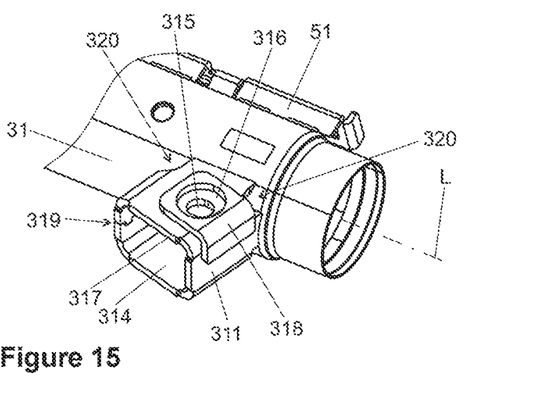
FIG. 15 is a detail view of still another example inner casing tube.

In the embodiment shown in FIG. 15, the second wall 318 is formed by a sheet metal strip fixed onto the locking pot 311, wherein the sheet metal strip comprises the opening 316 which is offset in respect of the first opening 315. The locking pot 311 has free spaces 320 on its bending edges, so that an improved connection between the locking pot 311 and the inner casing tube 31 through a flush joint is possible. This free space 320 can also be used with the other embodiments in FIGS. 12 to 14.

What is claimed is:

1. A steering column for a motor vehicle, the steering column comprising:
    an inner casing tube in which a steering spindle is mounted rotatably about a longitudinal axis;
    an outer casing unit in which the inner casing tube is retained, the outer casing unit being directly or indirectly connectable to a body of the motor vehicle;
    a motorized adjustment drive disposed between the outer casing unit and the inner casing tube, wherein the outer casing unit and the inner casing tube are displaceable relative to one another in a direction of the longitudinal axis by way of the motorized adjustment drive; and
    an energy absorption device coupling the inner casing tube and the outer casing unit, the energy absorption device including at least two energy absorption elements and a coupling device, wherein a first energy absorption element of the at least two energy absorption elements is configured to be coupled or uncoupled between the inner casing tube and the outer casing unit via the coupling device, wherein the first energy absorption element is plastically deformable in a coupled state with relative displacement in the direction of the longitudinal axis of the inner casing tube and the outer casing unit, wherein the coupling device has a coupling element that is movable between an uncoupled state and the coupled state, wherein the coupling element is movable into operative engagement with a coupling piece connected to the first energy absorption element.

2. The steering column of claim 1 wherein the coupling piece is configured as an intermediate element separate from the first energy absorption element.

3. The steering column of claim 1 wherein the coupling piece has a carrier element that engages with the first energy absorption element.

4. The steering column of claim 1 wherein the coupling piece is guided in a guide means in the direction of the longitudinal axis.

5. The steering column of claim 4 wherein the coupling piece comprises a guide body that is received displaceably in the direction of the longitudinal axis in a guide groove.

6. The steering column of claim 1 wherein the coupling piece has a coupling receiving means to which the coupling element is connectable.

7. The steering column of claim 1 wherein the energy absorption element has a predetermined breaking element.

8. The steering column of claim 1 wherein a support plate is coupled to the outer casing unit.

9. The steering column of claim 8 wherein the coupling piece is guided in a guide means in the direction of the longitudinal axis, wherein the support plate comprises the guide means.

10. The steering column of claim 8 wherein a carrier connected to a second energy absorption element of the at least two energy absorption elements is fixed to the support plate.

11. The steering column of claim 8 wherein the energy absorption element has a predetermined breaking element, wherein the support plate is connected to the inner casing tube via the predetermined breaking element.

12. The steering column of claim 8 wherein the coupling device is fixed to the support plate.

13. The steering column of claim 8 wherein the motorized adjustment drive is configured to contact the support plate.

14. The steering column of claim 1 wherein the coupling device has a pyroelectric actuator.

15. The steering column of claim 1 wherein at least one of the at least two energy absorption elements is formed as a bending element that has two legs connected to one another by a bend, wherein a first of the two legs is configured to be fixed to the outer casing unit and a second of the two legs is configured to be fixed to the inner casing tube in the direction of the longitudinal axis.

* * * * *